United States Patent [19]

De Smet

[11] Patent Number: 5,395,153
[45] Date of Patent: Mar. 7, 1995

[54] MOTOR VEHICLE SIDE PANEL

[75] Inventor: Gabriel De Smet, Enghien les Bains, France

[73] Assignee: Sollac, Puteaux, France

[21] Appl. No.: 111,558

[22] Filed: Aug. 25, 1993

[30] Foreign Application Priority Data

Aug. 28, 1992 [FR] France ................................ 92 10375

[51] Int. Cl.$^6$ .............................................. B60J 5/04
[52] U.S. Cl. .............................. 296/146.6; 296/146.9; 296/202
[58] Field of Search ............... 296/146.5, 146.6, 146.9, 296/202

[56] References Cited

U.S. PATENT DOCUMENTS

| 3,776,588 | 12/1973 | Sobajima et al. | 296/146.9 |
| 4,017,117 | 4/1977 | Eggert, Jr. | 296/146.9 |
| 4,488,751 | 12/1984 | Kling | 296/146.9 |
| 4,915,442 | 4/1990 | Garnweidner | 296/146.6 X |
| 4,917,433 | 4/1990 | Tomforde | 296/146.5 |

FOREIGN PATENT DOCUMENTS

| 0057270 | 8/1982 | European Pat. Off. . |
| 0302044 | 2/1989 | European Pat. Off. . |
| 0423465 | 4/1991 | European Pat. Off. . |
| 2119315 | 10/1971 | France . |
| 2161044 | 7/1973 | France . |
| 2257450 | 8/1975 | France . |
| 2418111 | 9/1979 | France . |
| 2567460 | 1/1986 | France . |
| 2045875 | 3/1972 | Germany . |
| 4140426 | 6/1993 | Germany | 296/146.6 |
| 3028020 | 2/1991 | Japan | 296/146.6 |
| 1347157 | 2/1974 | United Kingdom . |
| 1430988 | 4/1976 | United Kingdom | 296/146.9 |

*Primary Examiner*—Joseph Pape
*Attorney, Agent, or Firm*—Oblon, Spivak, McClelland, Maier & Neustadt

[57] ABSTRACT

A motor vehicle side panel which includes at least two uprights and a lower member of the substructure of the vehicle which form a door frame, and at least one door mounted upon the door frame which includes a solid lower part formed of an outer panel and an inner panel defining a housing for a drop glass therebetween. The inner panel is substantially planar and includes an inner side facing the door frame when the door is closed, with the inner panel including an outer side which faces the outer panel. Steel sections are welded on the inner side of the inner panel and project toward the door frame, with the steel sections extending at least along the portions of the inner panel which face the upright members and the lower member of the door frame. The upright members and the lower member of the door frame are provided with parts which project outwardly toward the inner side of the inner panel, with the parts of the door frame extending adjacent and along the steel sections of the door such that an interlocking connection is provided between the periphery of the inner panel of the door frame when the door is in the closed position.

18 Claims, 2 Drawing Sheets

MOTOR VEHICLE SIDE PANEL

BACKGROUND OF THE INVENTION

1. Field of the Invention

The subject of the present invention is a motor vehicle side panel including at least one door mounted on a door frame.

2. Discussion of Background

In a conventional manner, motor vehicles include two side panels connected together by the substructure of the vehicle and the roof.

Each side panel comprises one or two doors and a door frame, made up of side uprights, two in the case where the panel includes only one door, three in the case where the panel includes two of them, of a part of the substructure of the vehicle, and of a part of the roof.

Each door is connected to two side uprights by at least two hinges on the first and by a lock on the second.

The door conventionally comes into planar flush contact against the frame, with no mechanical insertion between the door and the frame.

During collisions between two motor vehicles, side impact, after frontal impact which is the more widespread, is the one which causes the most serious injuries, capable even of leading to the death of the occupants of the vehicle.

In the event of a side impact, the vehicle struck is subjected to the force due to the impact generally in the region of the doors, in a zone whose mechanical strength in compression in the direction of the impact is generally low.

This generally gives rise to great deformations of the side panel of the vehicle and a significant reduction in the volume of the passenger compartment.

Indeed, since the doors are in simple planar flush contact with the door frame and are connected to the said frame on the one hand by the hinges and, on the other hand by the lock, the parts in contact slide over one another due to the door panel being pushed in and in this case, the door absorbs only a very small part of the energy transmitted during the impact, due to the fact that the thin sheet metal of the door works mainly in bending.

It is known to reinforce the doors and to limit the extent to which they are pushed in by using reinforcement bars, called side-impact bars in order to absorb more of the energy due to the impact in the region of the doors. In this case, the energy due to the impact is distributed linearly over the reinforcement bars and is thus transmitted into the two side uprights of the door at the points at which the bars bear on the uprights.

In this case, the energy due to the impact is converted into a bending force on the reinforcing bars, which, after deformation of the bars, gives rise also to a deformation in bending of the uprights.

Such a deformation of the door uprights is very damaging to the occupants, these generally being seated in line with these uprights.

SUMMARY OF THE INVENTION

The invention proposes to provide a motor vehicle side panel making it possible to absorb a great quantity of energy during an impact, without giving rise to a significant deformation of the passenger compartment, and without subjecting the occupants to an acceleration due to the impact, which acceleration would endanger their lives, that is to say, an acceleration less than approximately 50 g (i.e., fifty times the earth's gravitational acceleration).

More particularly, the subject of the invention is a motor vehicle side panel comprising at least two uprights and a part of the substructure of the vehicle so as to form at least one door frame, and at least one door mounted on this frame and including a solid lower part formed of an outer panel and of an inner panel defining between them a housing for a drop glass, characterized in that the inner panel is substantially planar and the said inner panel of the solid part of the door and the part of the frame located facing it include complementary means producing an interlocking of the door on the frame when the door is in the closed position.

Preferably:
the inner panel of the solid part is planar;
the inner panel of the solid part is convex, the dish part pointing towards the inside of the vehicle;
the side panel includes a horizontal reinforcement situated in the upper part of the solid part of the door;
the means for producing interlocking of the door on the frame consist of a projection made on the perimeter of the solid portion of the door, and of a complementary projection made in the corresponding part of the frame;
in the case of doors including a window frame, the projections made on the door and on the door frame extend over the entire perimeter of the door and of the corresponding part of the frame;
the side panel includes at least one impact-absorbing means located in the solid part of the door, between the outer panel and the inner panel.

The subject of the invention is also a vehicle provided with such panels.

BRIEF DESCRIPTION OF THE DRAWINGS

Other features and advantages will emerge during the description which will follow, given solely by way of example and made with reference to the appended drawings in which.

DESCRIPTION OF THE PREFERRED EMBODIMENTS

Figure 1:
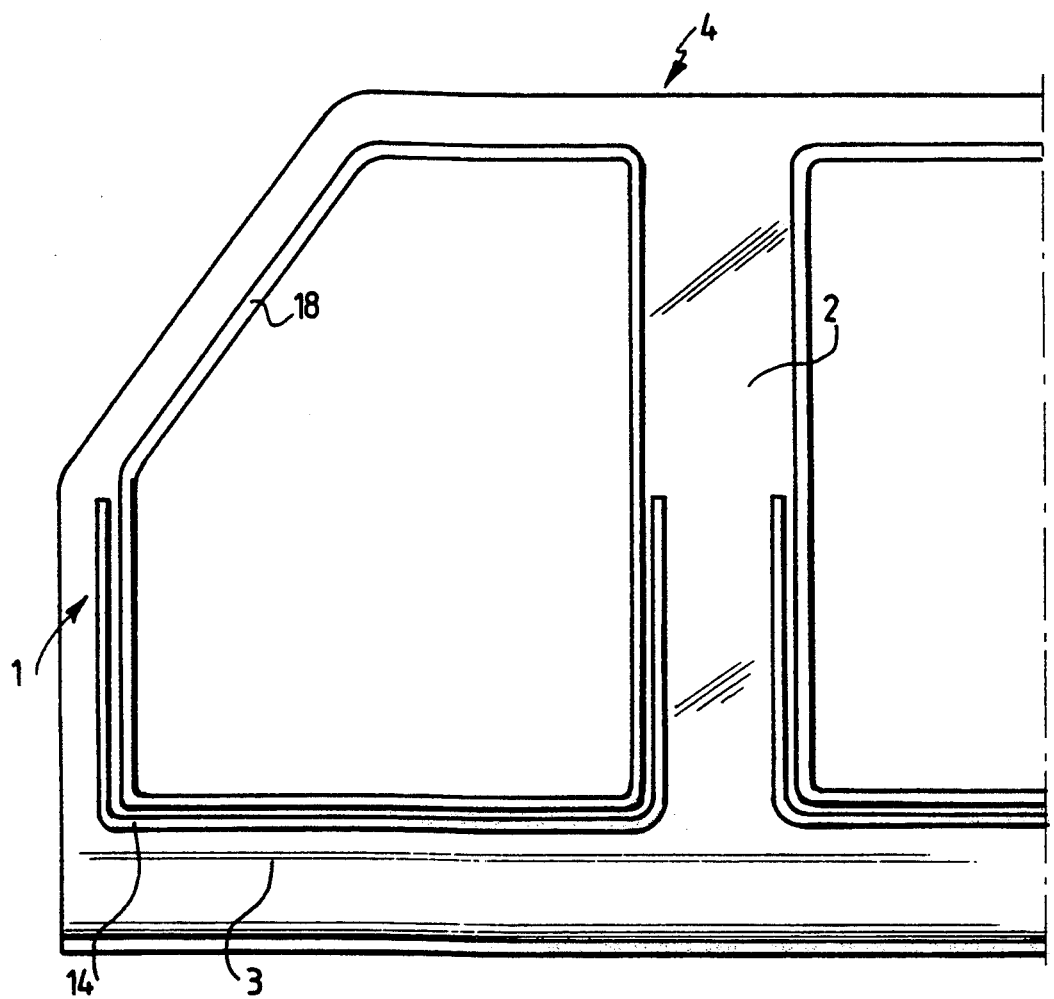
FIG. 1 is a diagrammatic partial elevation view of the external face of a side panel according to the invention.
Figure 2:
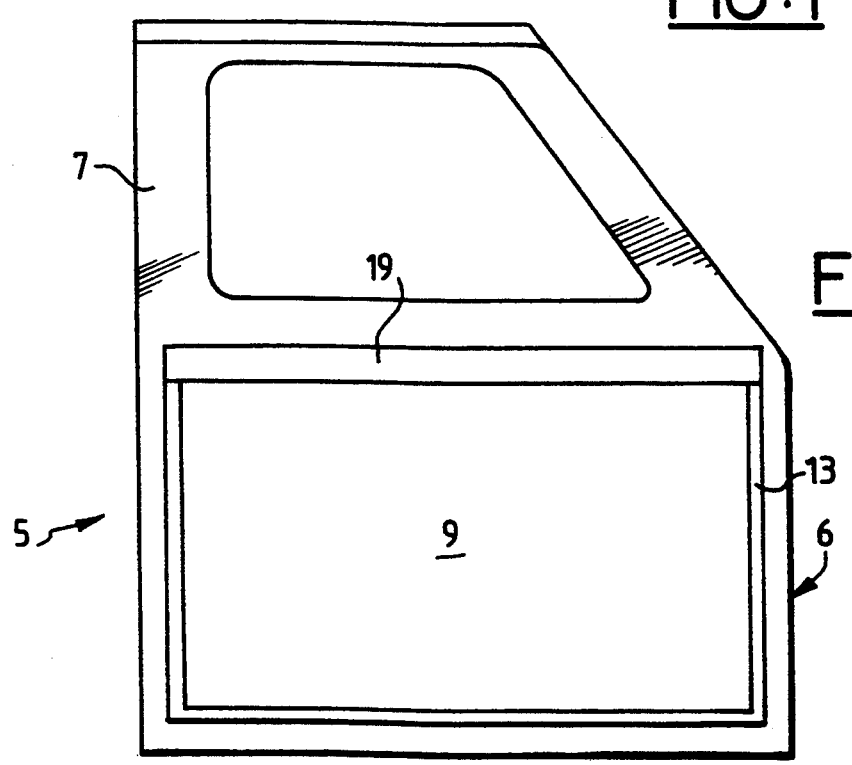
FIG. 2 is a diagrammatic view in elevation of the internal face of a door according to the invention.

The side panel according to the invention comprises at least two uprights 1, 2 and a part of the substructure 3 of the vehicle so as to form at least one door frame 4 (see FIG. 1).

It also comprises at least one door 5 mounted on the frame and comprising a solid lower part 6 and optionally a window frame 7.

The lower part 6 of the door includes an outer panel 8 and an inner panel 9 between them defining a housing 10 for a drop glass 11.

The solid part 6 of the door 5 and the corresponding part of the door frame 4 which are located facing one another include complementary means 12 producing an interlocking of the door on the frame when the door is closed.

The means 12 consist of a projection 13 made on the perimeter of the solid part 6 of the door 5 and of a projection 14 made in the part of the frame situated opposite. These projections are preferably continuous.

The door 5 includes a horizontal reinforcement 19 in the upper part of its solid part 6.

Figure 3:
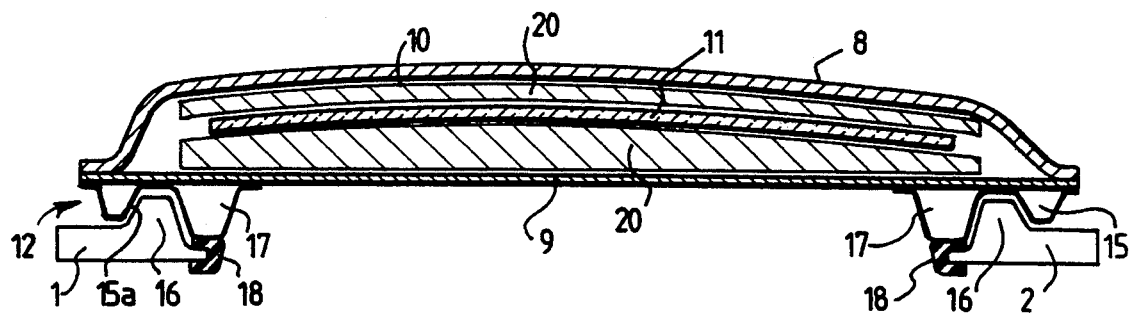
FIG. 3 is a view in transverse section of a motor vehicle side panel according to the invention, the door being closed.
Figure 4:
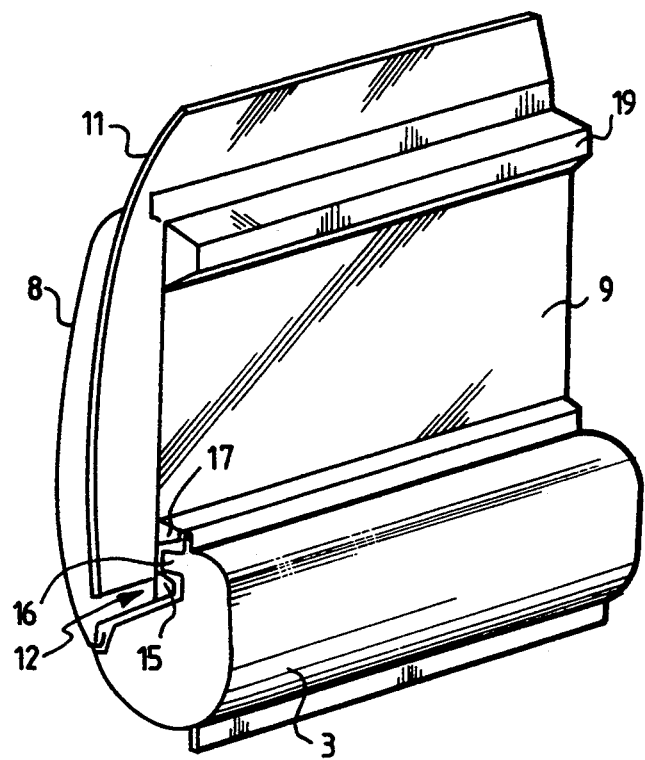
FIG. 4 is a diagrammatic view in perspective of a door according to the invention, with certain parts having been cut away.

In the embodiment represented in FIGS. 3 and 4, the inner panel 9 of the door 5 is substantially planar and includes a section 15 projecting towards the door frame 4, for example welded onto the perimeter of the panel 9.

The uprights 1 and 2 of the door frame 4 include a part 16 projecting towards the door and coming into contact with the inner face 15a of the section 15 and the substructure part 3 includes a part projecting towards the door and coming into contact with the inner face of the section of the inner door panel 9. The projecting part 16 may be produced integrally with the frame 4 or consist of a section welded onto the frame.

The sections 15 and 16 may have an omega-, U-, or L-shaped outline or any other suitable outline.

In the embodiment represented, the inner panel 9 of the door includes a second section 17 intended to interact with a seal 18 located on the door frame 4. This section 17 may be in a single piece with the section 15.

When the door includes a window frame 7, the means 12 may extend over the said frame and thus form a projection 13 made on the perimeter of the entire door and a projection 14 made on the entire perimeter of the door frame 4.

A horizontal reinforcement 19 is provided on the inner panel 9 of the door, at the region of the junction of this inner panel with the frame of the window, between the two rising parts of the projection 13.

The reinforcement 19 may be a section with an open or closed cross-section, welded onto the inner panel 9 of the door.

The side panel includes at least one impact-absorbing means (20) located in the solid part of the door, between the outer panel (8) and the inner panel (9).

The means (20) may for example be a plate of foam fixed or bonded inside the side panel.

In the example shown, the side panel includes two plates (20), a first one between the outer panel (8) and the window, when the latter is in a lowered position, and a second one between the inner panel (9) and the window when the latter is in the lowered position.

The panel may include a single plate 20 in contact on one of its faces with the outer panel 8 and on the other of its faces with the inner panel 9. In this case, the plate 20 is provided with a slit intended to act as a housing for the window.

This impact-absorbing means (20) has the object of transmitting the energy of the impact directly to the inner panel 9 of the side panel whilst distributing it over the said inner panel 9.

Such a configuration makes it possible, when the door is in the closed position on the door frame, to produce an interlocked connection of the door on the frame.

Thus, during a side impact, the door panel is not deformed by bending but undergoes a sort of stamping giving rise to a deformation by multi-axis tension of the said door panel in which deformation this panel is held in contact at its periphery with the door frame by means of the projections 13 and 14.

The interlocked connection of the door on the frame acts as somewhat of a clamp for the substantially planar inner panel of the door, which then behaves like an energy-absorbing membrane working, in the case of impact, in extension and not in bending as is the case with the side-impact reinforcing bars.

For this reason, the steel which makes up the door panel is subjected to essentially tensile stresses and the deformation of the panel is essentially due to the drawing out of the material, which increases its resistance to impacts.

During a standardized side impact resistance test on a motor vehicle (standard MVSS 214), carried out on a vehicle including a side panel according to the invention, for an inner panel produced from a steel sheet of 0.65 mm thickness, a maximum stress at the centre of the panel of 400 MPa and a minimum stress in the region of the projections of the order of 15 MPa, were noted.

After deformation of the door panel, the maximum deflection of the deformation is 140 mm.

In addition, the impact generated an acceleration on the occupants which was less than 30 g (i.e., thirty times the earth's gravitational acceleration).

An additional advantage connected with the vehicle side panel according to the invention is the use of very thin doors because it is not necessary to stiffen the door by giving it a box-structure shape.

Numerous embodiment variants may be envisaged without departing from the scope of this invention; thus the so-called projecting part of the frame may be produced in the form of a groove in which the projecting part of the door is engaged.

I claim:

1. A motor vehicle side panel comprising:
   at least one door frame having at least two upright members and a lower member which is part of the substructure of the vehicle;
   a door mounted on the door frame, said door including a solid lower part formed of an outer panel and an inner panel, each of said outer and inner panels made of steel, said outer and inner panels being interconnected at their periphery and defining a housing for a drop glass between said inner and outer panels;
   said inner panel being substantially planar and including an inner side facing said at least one door frame when said door is in a closed position, said inner panel further including an outer side facing the outer panel;
   the door further including steel sections welded on the inner side of said inner panel, said steel sections projecting toward the door frame and extending at least along portions of said upright members and the lower member of the door frame;
   wherein the upright members and the lower member of the door frame include parts which project outwardly toward the inner side of the inner panel and which extend adjacent and along said steel sections of said door, and wherein said parts are disposed inside of said steel sections of said door with respect to a direction extending from a periphery of said inner panel to a center of said inner panel, such that an interlocking connection is provided between the periphery of said inner panel and the door frame when the door is in the closed position, and such that said inner panel undergoes a stamping deformation by multi-axis tension when subjected to a side impact.

2. The side panel of claim 1, further including at least one impact absorbing means disposed between said outer and inner panels.

3. The side panel of claim 2, wherein said impact absorbing means comprises a plate made of foam.

4. The side panel of claim 1, further including a horizontal reinforcement disposed at an upper portion of said solid lower part of said door.

5. The side panel of claim 1, wherein said door includes a window frame, and wherein said steel sections of said door and said parts of said door frame extend at least partially into said window frame.

6. The side panel of claim 5, wherein said steel sections of said door extend about a perimeter of said door and said parts of said door frame extend about a perimeter of said door frame corresponding to said perimeter of said door.

7. The side panel of claim 1, wherein said steel sections of said door and said parts of said door frame have an omega shape.

8. The side panel of claim 4, wherein said horizontal reinforcement includes a section welded onto an upper edge of said inner panel.

9. The side panel of claim 1, further including interior steel sections projecting from said inner panel toward the door frame and disposed interiorly of said parts of said door frame with respect to said direction which extends from the periphery of said inner panel toward the center of said inner panel such that said parts are disposed between said steel sections and said interior steel sections when said door is in said closed position.

10. The side panel of claim 1, further including additional steel sections adjacent said first mentioned steel sections, said additional steel sections engaging a complementary member provided on said door frame to thereby define a seal.

11. A motor vehicle side panel comprising:
at least one door frame having at least two upright members and a lower member which is part of the substructure of the vehicle;
a door mounted on the door frame, said door including a solid lower part formed of an outer panel and an inner panel, each of said outer and inner panels made of steel, said outer and inner panels being interconnected at their periphery and defining a housing for a drop glass between said inner and outer panels;
said inner panel being substantially planar and including an inner side facing said at least one door frame when said door is in a closed position, said inner panel further including an outer side facing the outer panel;
the door further including steel sections welded on the inner side of said inner panel, said steel sections projecting toward the door frame and extending at least along portions of said upright members and the lower member of the door frame;
wherein the upright members and the lower member of the door frame include parts which project outwardly toward the inner side of the inner panel and which extend adjacent and along said steel sections of said door, and wherein said parts are disposed inside of said steel sections of said door with respect to a direction extending from a periphery of said inner panel to a center of said inner panel, such that an interlocking connection is provided between the periphery of said inner panel and the door frame when the door is in the closed position, and such that said inner panel undergoes a stamping deformation by multi-axis tension when subjected to a side impact;
the side panel further including at least one shock absorbing plate disposed between the inner and outer panels to thereby further improve energy absorption efficiency resulting from deformation of said inner panel by transmitting energy of an impact from said outer panel to said inner panel.

12. The side panel of claim 11, further including a horizontal reinforcement disposed at an upper portion of said solid lower part of said door.

13. The side panel of claim 11, wherein said door includes a window frame, and wherein said steel sections of said door and said parts of said door frame extend at least partially into said window frame.

14. The side panel of claim 13, wherein said steel sections of said door extend about a perimeter of said door and said parts of said door frame extend about a perimeter of said door frame corresponding to said perimeter of said door.

15. The side panel of claim 11, wherein said steel sections of said door and said parts of said door frame have an omega shape.

16. The side panel of claim 12, wherein said horizontal reinforcement includes a section welded onto an upper edge of said inner panel.

17. The side panel of claim 11, further including interior steel sections projecting from said inner panel toward the door frame and disposed interiorly of said parts of said door frame with respect to said direction which extends from the periphery of said inner panel toward the center of said inner panel such that said parts are disposed between said steel sections and said interior steel sections when said door is in said closed position.

18. The side panel of claim 11, further including additional steel sections adjacent said first mentioned steel sections, said additional steel sections engaging a complementary member provided on said door frame to thereby define a seal.

* * * * *